United States Patent [19]
Arato

[11] Patent Number: 5,552,055
[45] Date of Patent: Sep. 3, 1996

[54] PHOTOFINISHING EFFLUENT PURIFYING PROCESS AND APPARATUS

[75] Inventor: George J. Arato, Vancouver, Canada

[73] Assignee: London Drugs Limited, Richmond, Canada

[21] Appl. No.: 305,309

[22] Filed: Sep. 15, 1994

[51] Int. Cl.⁶ .................................................. B01D 61/00
[52] U.S. Cl. .......................... 210/651; 210/650; 210/652; 210/653; 210/668; 210/694; 210/195.2; 210/257.2
[58] Field of Search .................................. 210/650, 651, 210/652, 653, 654, 661, 668, 694, 263, 264, 86, 195.2, 257.2

[56] References Cited

U.S. PATENT DOCUMENTS

| 2,653,089 | 9/1953 | Brooke | 210/688 |
|---|---|---|---|
| 3,679,053 | 7/1972 | Koulovatos et al. | 210/86 |
| 4,040,834 | 8/1977 | Iwano et al. | 210/654 |
| 4,744,825 | 5/1988 | Chen et al. | 210/688 |
| 4,959,122 | 9/1990 | Kurematsu et al. | 210/195.2 |
| 5,242,597 | 9/1993 | McArdle | 210/652 |
| 5,294,652 | 3/1994 | Rainer | 210/688 |
| 5,403,490 | 4/1995 | Desai | 210/652 |

FOREIGN PATENT DOCUMENTS

| 57-207585 | 12/1982 | Japan | 210/652 |
|---|---|---|---|
| 31884 | 2/1985 | Japan | 210/652 |
| 851064 | 7/1985 | WIPO | 210/652 |

OTHER PUBLICATIONS

JP57-207585, Abstract (Japio), Dec. 20, 1982.

*Primary Examiner*—Ana Fortuna
*Attorney, Agent, or Firm*—Bull, Housser & Tupper

[57] ABSTRACT

The invention provides a process and apparatus for on-site purification of photofinishing effluent produced by mini-lab photofinishing apparatus and the like. The process includes passing the effluent through an adsorbent to adsorb inorganic and organic compounds to produce a primary filtrate fluid. The primary filtrate fluid is directed to a membrane filter which in turn discharges relatively clean permeate fluid which passes through the membrane filter as a secondary filtrate fluid, and rejects concentrate fluid that does not pass through the membrane filter. Preferably the effluent is passed through a plurality of adsorbents of which at least one adsorbent adsorbs inorganic compounds, and at least one other adsorbent adsorbs organic compounds. The adsorbent is provided in containers, each of which has an inlet and outlet provided with conduit coupling means, and conduits interconnect the containers in a series flow path relationship. The container that first receives the effluent becomes exhausted first, and the container receiving the effluent last is the least exhausted. As a container becomes exhausted, a fresh container is substituted and appropriate conduits are connected so that the fresh container becomes the last container.

26 Claims, 1 Drawing Sheet

5,552,055

PHOTOFINISHING EFFLUENT PURIFYING PROCESS AND APPARATUS

BACKGROUND OF THE INVENTION

The invention relates to a process and apparatus for clarifying photofinishing chemical effluent, in particular the liquid effluent produced from "mini-labs" using automated photofinishing machines operated by relatively unskilled personnel, as opposed to larger, high production photofinishing chemical laboratories staffed by skilled technicians.

In the past, photofinishing chemical laboratories for processing relatively large volumes of colour photographs were relatively large organizations staffed by skilled personnel, and were accustomed to dealing with relatively large quantities of liquid waste generated in high volume production photofinishing operations. In large organizations, processing of the photofinishing chemical effluent could be economically handled by relatively high capacity and costly effluent filtration equipment, and the large quantities of liquid waste that was processed generated relatively large quantities of toxic concentrates which could be disposed of economically.

In the last few years, automated photofinishing equipment has become widely available and is used in small "mini-labs" which are known for fast service, and can commonly produce prints from a negative film within one hour of the customer leaving the film for processing. Automated photofinishing apparatus permits the use of a relatively small number of operators, and because many of the technical operations are performed automatically by the apparatus, the level of skill of the operators is considerably less than is required in the earlier large processing labs. In the last few years there has been a large increase in "mini-labs" which are distributed throughout urban areas, and each "mini-lab" generates photofinishing chemical effluent. Common practice is to dump this effluent into municipal sewers, which produces corresponding problems downstream in a sewerage plant, if one is provided, or in the body of water receiving the sewer discharge. When the number of "mini-labs" is relatively small, the accumulative effect of photofinishing chemical discharge is relatively minor, but as the number of "mini-labs" increases, the accumulative effect becomes a serious consideration, and municipalities are now requiring treatment of these discharges, even of the relatively small amounts from "mini-labs".

In relatively large photofinishing laboratories, photofinishing chemical effluent is sometimes purified by evaporation and distillation. The distillation produces a distillate which is sufficiently pure to dump into the sewer, and the remaining toxic concentrate can be incinerated or sent to a hazardous waste landfill.

Because of the shortage of skilled personnel in the "mini-labs" and the relatively small quantities of effluent produced, processing the effluent from "mini-labs" using conventional techniques found in the larger labs is not economic, or practical. Due to transportation costs, and the hazards of transporting toxic wastes, it is also not practical to have regular pick-up of untreated photofinishing chemical effluent by toxic waste trucks, for processing in a larger central facility.

To the inventor's knowledge, attempts to use membrane filtration techniques for purification of photofinishing chemical effluents have been unsuccessful because the effluents are highly contaminated or concentrated liquids with complex chemicals which quickly plug the fine pores of the membranes, reducing life of the membranes which are costly. In addition, even if the plugging of the membrane could somehow be avoided, the high concentration of chemicals in the effluent causes concentration polarization at the membrane surface, and chemical interaction between the effluent and the membranes which renders membrane filtration by itself unpractical for photofinishing effluent.

What is required for "mini-labs" is a photofinishing chemical effluent treatment system which requires minimal intervention by skilled or unskilled operators, and permits processing of liquid effluent so that final liquid discharge is of an acceptable quality for dumping in municipal sewers. In addition, any toxic materials in the effluent should be concentrated so as to be in relatively small volumes to permit economic transportation of the concentrate to a central processing plant for further processing or disposal. To the inventor's knowledge, there are no suitable compact, low-cost "user-friendly" photofinishing chemical effluent treatment systems available for "mini-labs" as described above.

SUMMARY OF THE INVENTION

The invention reduces difficulties and disadvantages of the prior art by providing a relatively low cost, compact, user-friendly, photofinishing chemical effluent purifying apparatus which processes the effluent to a high degree of purity sufficient to permit final liquid discharged from the apparatus to be dumped into municipal sewers. Alternatively, if desired, the final liquid produced can be re-used in the photofinishing process, and thus the system can approach a so-called "zero-effluent" system. The system produces a relatively small volume of toxic concentrates which are in a form to permit easy, low cost transportation, at economic intervals, to a main processing plant for final treatment for re-use or disposal. The apparatus receives photofinishing chemical effluent discharged from a "mini-lab" photofinishing apparatus, and requires minimal manual intervention by operators who merely have to perform certain routine unskilled tasks requiring essentially negligible monitoring of the system's performance. In addition, by selecting suitable adsorbents used in the process, the chemicals adsorbed can be extracted from the adsorbents, which are in effect purified for re-use in the system, further reducing material for disposal.

A process according to the invention is for purifying a photofinishing chemical effluent and comprising the steps of:

passing the effluent through an adsorbent to adsorb organic and inorganic compounds to produce a primary filtrate fluid, directing the primary filtrate fluid to a membrane filter and discharging permeate fluid that passes through the filter as a secondary filtrate fluid, and rejecting concentrate fluid that does not pass through the membrane filter.

Preferably, the effluent is passed through a plurality of adsorbents, and at least one adsorbent adsorbs inorganic compounds, and at least one other adsorbent adsorbs organic compounds. Preferably, the effluent fluid is passed through a plurality of containers containing the adsorbents, the containers being arranged in a series flow path. In this way, the effluent passes through a first container and then through a second container so that the adsorbent in the first container becomes exhausted before the adsorbent in the second container. When the adsorbent in the first container becomes exhausted, flow path through the containers is changed so that the second container receives the effluent flow first. The flow is directed to leave the plurality of containers through a last container so that the adsorbent in the last container is least exhausted and, when the exhausted first container is replaced with a fresh container containing fresh adsorbent, the flow from the last container is redirected to pass into the fresh container.

Preferably, the process is further characterized by:

storing the primary filtrate fluid in a tank, detecting a relatively high level of filtrate fluid in the tank, pressurizing flow of the primary filtrate fluid prior to passing through the membrane filter, detecting a relatively low level of filtrate fluid in the tank, and stopping flow of primary filtrate fluid from the tank through the membrane filter.

An apparatus according to the invention is for purifying photofinishing chemical effluent and comprises an adsorbent means and a membrane filtering means. The adsorbent means is for adsorbing inorganic and organic compounds, and has an inlet to receive the effluent and an outlet to discharge the effluent as a primary filtrate fluid. The membrane filtering means has a membrane filter, an inlet to receive the primary filtrate fluid discharged from the adsorbent means, a permeate fluid outlet to discharge permeate fluid passing through the filter as a secondary filtrate fluid, and a concentrate fluid outlet to discharge a concentrate fluid that is rejected by the membrane filter. Preferably, the adsorbent means has a plurality of adsorbent containers, in which a least one container contains adsorbent to adsorb inorganic compounds, and at least one container contains adsorbent to adsorb organic compounds and the adsorbent containers are connected in series. Preferably, the apparatus further comprises a tank to store the primary filtrate, and a high pressure pump. The tank has upper and lower level detectors, and a tank inlet and outlet, the tank inlet communicating with the adsorbent means. The high pressure pump has a inlet communicating with the tank outlet, and a outlet communicating with the membrane filtering means.

A detailed disclosure following, related to a drawing, describes a preferred process and apparatus, according to the invention, which is capable of expression in a process and apparatus other than those particularly described and illustrated.

DETAILED DESCRIPTION

Figure 1:
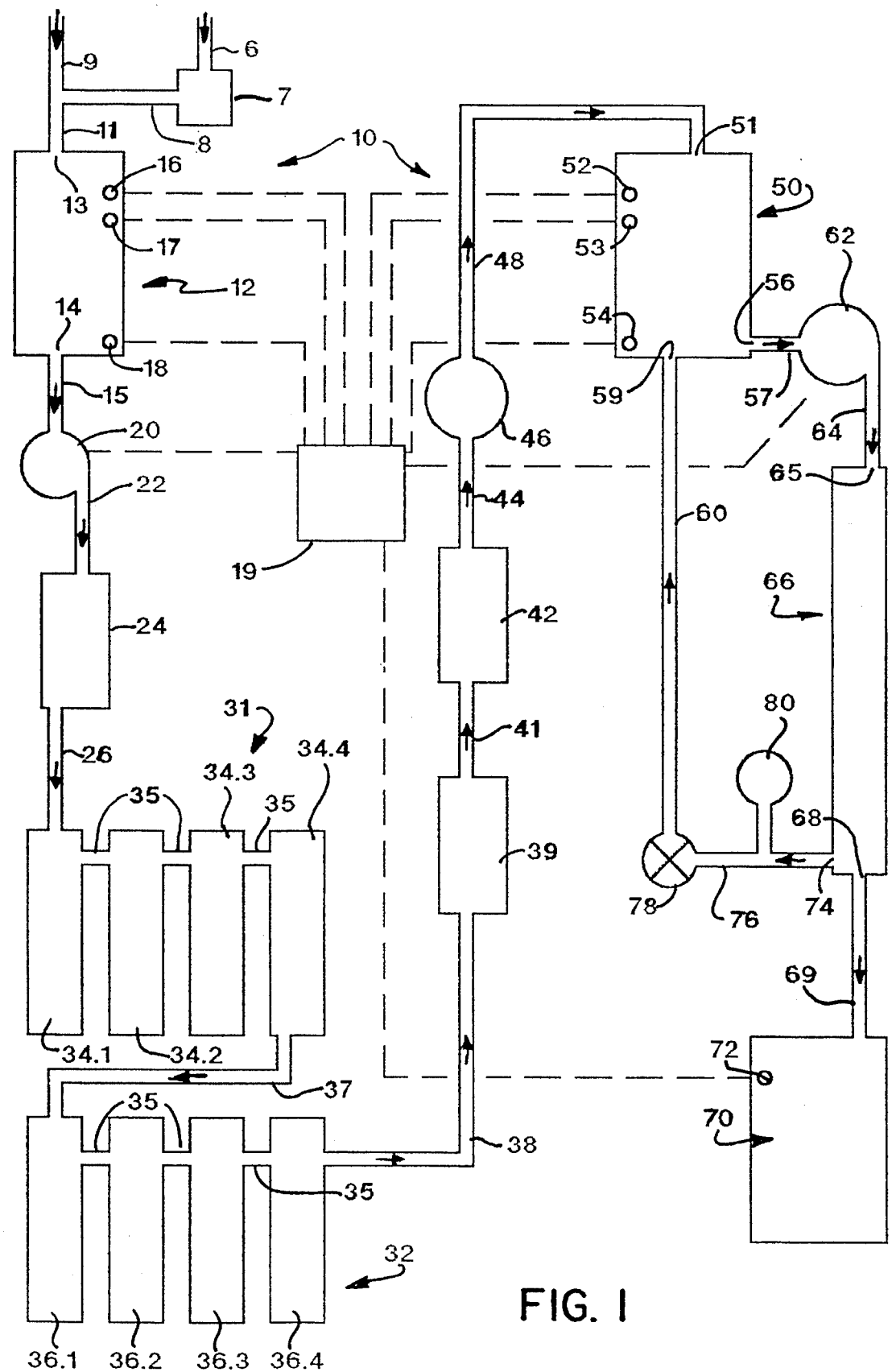
FIG. 1 is a simplified schematic showing components associated with a effluent purifying apparatus according to the invention.

An apparatus 10 according to the invention is for processing non-silver bearing photofinishing chemical effluent discharged from a "mini-lab" photofinishing machine (not shown), or discharged from a photofinishing effluent silver recovery apparatus. In the present example, a conduit 6 carrying silver-bearing effluent from the photofinishing machine passes into a prior art silver recovery unit 7 which extracts silver compounds therefrom in a normal manner. A conduit 8 carries non-silver bearing effluent from the unit 7 to join a conduit 9 feeding non-silver bearing effluent from another portion of the photofinishing machine. The conduits 8 and 9 join into a single conduit 11 for feeding non-silver bearing effluent into the apparatus. Silver compounds have been recovered from photofinishing effluent for many years using well known silver recovery means which are mounted upstream of the present apparatus, and do not require further description. Clearly, due to the high salvage value of silver bearing photofinishing chemicals, these are first removed from the effluent stream for separate processing, prior to processing of the balance of the effluent by the present apparatus.

The apparatus 10 includes a collection tank 12 having an inlet 13 to receive the non-silver bearing effluent from the conduit 11, and an outlet 14 discharging into a conduit 15 as shown. The tank has a high level alarm sensor 16, an upper level sensor 17, and a lower level sensor 18, located in appropriate positions in the tank so as to be exposed to liquid levels in the tank. The high level alarm sensor 16 is in the highest position and generates an audible alarm to indicate to the operator that the liquid level has exceeded the upper level sensor 17, thus requiring manual intervention on an emergency basis. The alarm sensor 16 and the upper and lower level sensors 17 and 18 are electrically connected by conductors, shown schematically as broken lines, to a control unit 19, for remote monitoring and activation of other equipment as will be described. In the description following, examples of capacities of components will be given, which capacities are typical capacities for a photofinishing apparatus used in a "mini-lab", which is designed to process approximately 50, 36-exposure rolls of 35 mm film per hour.

A conduit 15 extends from the outlet 14 of the tank 12 to a variable speed transfer pump 20 which is a relatively low pressure pump which is adjusted to deliver an output flow of approximately 1 U.S. pint per minute (0.5 liters per minute). The transfer pump 20 is connected to the control system receiving signals from the upper and lower level sensors 17 and 18 associated with the collection tank 12, and thus cooperates with the level sensors as follows. The pump starts when the upper level sensor is activated when the tank is being filled, and the pump stops when the lower level sensor is activated when the tank is being emptied. A conduit 22 directs fluid from the pump 20 to a first filter 24 which is a relatively coarse filter, for example a 50 micron filter, which serves to trap relatively large solids carried in the effluent.

A conduit 26 extends from an outlet of the filter 24 to a plurality of adsorbent containers disposed as first and second sets of adsorbent containers and designated 31 and 32 respectively. The first set of adsorbent containers contains four containers which can be essentially identical and are designated 34.1, 34.2, 34.3 and 34.4. The containers are conventional adsorbent containers with each container having an undesignated inlet and outlet with a respective conduit connecting means, preferably a quick-release or snap-on, snap-off, fluid type connector which is well known in the trade. The first set 31 of adsorbent containers also contains a plurality of conduits 35, preferably flexible conduits, which have opposite ends fitted with releasable connecting means which are complementary to the conduit connecting means of the inlets and outlets of the containers, so as to permit easy connection and disconnection between containers. As seen, the containers are arranged in a series flow path so that fluid flows from the container 34.1 in sequence to the container 34.4. Preferably, each container has a capacity of about 15 U.S. gallons (57 liters) and contains approximately 66 pounds (30 kg) of adsorbent as will be described. In addition, because the containers are relatively large and heavy, they are provided with wheels to facilitate manoeuvring the containers on a level surface, so as to facilitate interchanging the connections between the containers as will be described.

The second set of containers is generally similar to the first set and comprises containers 36.1, 36.2, 36.3, and 36.4.

As before, all the containers of the second set are connected together with the conduits 35 having quick release connections to facilitate interchanging of connections between the containers as will be described. A main connecting conduit 37 extends between the last container 34.4 of the first set 31 and the first container 36.1 of the second set 32.

The first set 31 of the containers contains an adsorbent for adsorbing inorganic compounds and polar components, a preferred adsorbent being activated attapulgite. Attapulgite is a clay mineral and is the active ingredient in most fuller's earths. Fuller's earths have many uses, such as a suspending agent, an oil well drilling fluid, a thickener in latex paints, fulling wool, disposal of radioactive wastes, etc. Fuller's earths have high adsorptive power and can also be used as an adsorbent in refining and de-colorizing oils, as a catalyst and as a bleaching agent for vegetable and mineral oils, and in the reclamation of used lubricating oils and electrical transformer cooling oils. Generally equivalent adsorbents for inorganic compounds include activated clay, bentonite, montmorillonite, zeolite, molecular sieve 13X type, etc. The second set 32 of adsorbent containers contains adsorbents for organic compounds and apolar components, preferably granulated activated carbon, e.g. Calgon (Trade Mark) F-400, F-200 or CPG-LF 12×40 mesh as supplied by Calgon Carbon Corporation of Pittsburgh, Pa., U.S.A., or Norit (Trade Mark) PK 1-3 supplied by Norit N.V. of Amersfoord, The Netherlands, or equivalents. Granulated activated carbon has been used for many years as an organic compound adsorbent, primarily in gas filters to adsorb noxious gasses, etc. Activated carbon is also an effective de-colorizer for cleaning liquids which have become discolored over time, usually as a result of oxidation, e.g. old cooking oil, etc. The first and second sets of adsorbent containers thus serve as an adsorbent means for absorbing inorganic and organic compounds respectively. The adsorbent means has an inlet, namely the inlet of the first container 34.1 to receive the effluent in the conduit 26, and an outlet, namely the outlet from the last container 36.4, to discharge the effluent as a primary filtrate fluid.

The last container 36.4 discharges the partially purified primary filtrate fluid at a rate of about 1 U.S. pint/minute (0.5 liters/minute) into a conduit 38 which extends into an intermediate filter 39, which is typically a 10 micron filter designed to trap any particulates of adsorbent discharged from the adsorbent containers. A conduit 41 extends from the filter 39 to a relatively fine filter 42, such as a 1 micron filter, which serves as a final filter to protect a membrane filter as will be described. Thus, the apparatus has a relatively coarse filter located upstream of the inlet of the adsorbent means, and at least one relatively fine filter located between the adsorbent means and the membrane filter.

A conduit 44 conducts the liquid from the filter 42 through an integrating flow meter 46 which measures total volume flow of liquid through the conduit 44. A conduit 48 extends from the flow meter 46 to a holding tank 50 which stores the primary filtrate fluid until a specific volume is attained. The tank 50 has a high level alarm sensor 52, an upper level sensor 53 and a lower level sensor 54 which can be generally similar to the alarm sensor and level sensors 16, 17 and 18 of the tank 12 and are located in the tank 50 at appropriate locations. The sensors 52, 53 and 54 are connected to the control unit 19 as shown schematically. The tank has an outlet 56 discharging into a conduit 57, and a secondary inlet 59 communicating with a conduit 60 as will be described.

A high pressure pump 62 is controlled by the control unit and thus cooperates with the sensors 53 and 54 in a manner similar to the pump 20 and the sensors 17 and 18. The pump 62 receives liquid in the conduit 57 discharged from the outlet 56 at a relatively low pressure and increases the pressure to a range of between 400 and 600 psi (3000 and 4500 kPa) for a particular type of filter membrane as will be described. A conduit 64 extends from an outlet of the pump 62 into an inlet 65 of a membrane filtration apparatus 66 which has a membrane filter, not shown, which is a nano-filtration filter but it could be a filter for ultra-filtration or reverse osmosis. As is well known, the membrane filter of ultra-filtration requires less operating pressure, for a given permeate fluid flow rate or production, than the finer filters used for nano-filtration or reverse osmosis filtration but quality of the permeate fluid is lower. For an adequate permeate production of about 2 U.S. pints/min (1 liter/min), an ultra-filtration membrane can operate at between 50 and 200 psi (350 through 1400 kPa), a nano-filtration filter can operate at between 200 and 600 psi (1400 through 4200 kPa) and a reverse osmosis filter can operate at 400 through 1,000 psi (2800 through 7000 kPa). The membrane could be any commercial membrane manufactured for nano-filtration in this instance, or for reverse osmosis or ultra-filtration as required. The preferred type of membrane is a thin-film composite spiral cartridge, specifically the spiral wound polyamide advanced composite membrane. This membrane features large surface area confined in a small geometry assuring good output and excellent quality permeates.

The membrane filtration apparatus 66 has a permeate fluid outlet 68 connected to a conduit 69 to feed into a permeate collecting tank 70. The tank 70 has a high level alarm sensor 72 to indicate when the tank is full for manual emptying or replacement. The permeate fluid outlet discharges permeate fluid passing through the filter as a secondary filtrate fluid, which is usually of a quality sufficient for re-use in the apparatus, for example, for mixing with fresh photofinishing chemicals, for washing filters, or it can be dumped straight into the sewer. The membrane filtration apparatus 66 also has a concentrate fluid outlet 74 which is connected by a conduit 76 to a manually adjustable pressure setting valve 78. A pressure gauge 80 is exposed to pressure in the conduit 76, which pressure is changed by manually adjusting the valve 78 to attain the desired operating membrane pressure on the pressure side of the filter membrane. The conduit 60 extends from the valve 78 to the secondary inlet 59 of the holding tank 50, so as to return concentrate fluid from the membrane filtration apparatus 66 back into the holding tank 50. Concentrate fluid rejected by the membranes is thus returned to the holding tank through a recirculating conduit, i.e. the conduit 60, extending from the concentrate fluid outlet to communicate with the primary filtrate fluid in the holding tank, and passed through the membrane filtration apparatus again to extract further permeate therefrom.

OPERATION

The following description assumes that the adsorbent in the first and second sets of adsorbent containers 31 and 32 is new, and that the tanks 12, 50 and 70 are empty, and the pumps 20 and 62 are stopped. Effluent from which silver has been removed in the conduit 8, and non-silver bearing effluent in the conduit 9, are collected from the photofinishing apparatus and fed into the conduit 11, to enter the tank 12 through the inlet 13. As the effluent level in the tank 12 increases, the liquid level therein first passes the sensor 18, and then the sensor 17 is activated, which causes the transfer pump 20 to switch on. The pump 20 starts pumping effluent through the outlet 14 and the conduit 15 through the conduit 22, to the first filter 24 and the conduit 26 into the inlet of the container 34.1 of the first set of adsorbent containers 31. As the adsorbent containers in the first set are arranged in series, the adsorbent in the first container 34.1 tends to adsorb more of the inorganic compounds from the effluent stream than the containers 34.2, 34.3 and 34.4 located downstream therefrom. Consequently, the first container 34.1 becomes exhausted first as will be described later herein.

Effluent leaving the last container 34.4 of the set 31 through the conduit 37 has been treated to remove much of the inorganic compounds, and so when that effluent enters the first adsorbent container 36.1 of the second set of containers 32 there is little contamination of the adsorbent with inorganic compounds. As the effluent flows through the containers 36.1 through 36.4, organic compounds are adsorbed in the activated carbon, and thus the primary filtrate fluid leaving the last container 36.4 has been treated to remove most of the organic compounds as well. In general, about 85%–90% of dissolved inorganic and organic compounds have been removed from the original effluent as measured by chemical oxygen demand (COD). In addition, the primary filtrate fluid has a pH range of 4 through 11 when the device operates in continuous operation, which range is within the preferred pH range of membrane filters used herein. Any adsorbent particles carried in the primary filtrate fluid along the conduit 38 are trapped in the intermediate filter 39 and the fine filter 42 prior to passing through the flow meter 46 which measures total volume flow passing through the apparatus. Thus, it can be seen that the first portion of the process comprises passing the effluent through an adsorbent to adsorb organic and inorganic compounds to produce the primary filtrate fluid.

The primary filtrate fluid enters the holding tank 50 through the main inlet 51, and is stored in the tank temporarily as level in the tank gradually increases, passing the lower level sensor 54 and eventually reaching the upper level sensor 53. When the upper level sensor is activated, thus detecting a high level in the tank the high pressure pump 62 commences to draw liquid through the conduit 57 and to pressurize it and discharge it through the conduit 64 to pump it into the membrane filtration apparatus 66. The pressure setting valve 78 is adjusted manually until pressure on the upstream side of the membranes reaches the desired operating pressure of the specific membranes employed. As previously described, range of membrane operating pressures varies from a low value of approximately 50 psi (350 kPa) for an ultra-filtration membrane, to a relatively high value of between about 400 and 1,000 psi (2800 and 7000 kPa) for a reverse osmosis membrane. Pressure on the upstream side of the membrane is displayed by the pressure gauge 80 and after initial transient conditions, a steady stream of permeate fluid which passes the membrane is discharged through the conduit 69 into the permeate collecting tank 70. Thus, it can be seen that a second aspect of the process comprises directing the primary filtrate fluid to a membrane filter and discharging permeate fluid that passes through the membrane filter as a secondary filtrate fluid.

Pressurizing flow of the primary filtrate fluid from the tank 50 prior to passing through the membrane filtration apparatus 66 continues until level in the tank 50 is lowered to activate the lower level sensor 54. Thus, when a relatively low level of primary filtrate fluid in the tank 50 is detected, the pump 62 is stopped, thus stopping flow of the primary filtrate fluid from the tank through the membrane filter. The membrane filtration apparatus 66 thus stops working temporarily until level of the first filtrate fluid in the tank 50 increases sufficiently to activate the upper level sensor 53 again. At this time the pump 62 is restarted and the membrane filtration apparatus 66 once again commences to pass permeate fluid until the tank 50 is again drawn down to the lower level sensor 54 which again stops the pump. This causes intermittent operation of membrane filtration apparatus 66 which is because generation of the primary filtrate fluid is much slower than generation of the secondary filtrate fluid as previously described. The permeate collecting tank 70 gradually fills until the high level alarm sensor 72 is reached and activated, which sounds an audible alarm to warn the operator to empty or replace the tank.

Whenever the apparatus 66 is operating, concentrate fluid rejected by the membranes, still at the membrane operating pressure, passes through the valve 78 where its pressure is reduced considerably, after which it passes along the conduit 60 into the secondary inlet 59 of the holding tank 50. The concentrate fluid accumulates with the primary filtrate fluid in the tank 50, and passes again through the membrane filtration apparatus 66, permitting a portion of the previously rejected concentrate fluid to pass the membrane. Thus, it can be seen that the last step of the process comprises rejecting the concentrate fluid that does not pass through the membrane filter and this can be either recycled as described above, or discarded as required. For typical effluent, it has been found that approximately 80 through 90 percent of primary filtrate fluid entering the membrane filtration apparatus 66 is discharged as permeate fluid, and thus 10 through 20 percent of the primary filtrate fluid is rejected and returns as concentrate fluid to the tank 50.

The delivery volume flow rate of the high pressure pump 62 is relatively high when compared with the delivery volume flow rate of low pressure pump 20. This difference in delivery results in the level of liquid in the tank 72 tending to trigger the lower level sensor 54 before the liquid level in the tank 12 drops sufficiently to trigger the low level sensor 18. Consequently, the high pressure pump 62 tends to operate for a considerably shorter period of time than the low pressure pump 20 due to the differences in flow through the membrane filtering apparatus and the first and second sets of adsorbent containers.

It has been found that when using a nano-filtration filter, that the membrane filtration unit delivers a purified secondary filtrate fluid which is at least 99% pure, having a COD and biological oxygen demand (BOD) values of under 100 mg/liter, containing less than 5 mg/liter ammonia, and less than 1 mg/liter silver.

As can be seen, a portion of the process comprises passing the effluent fluid through a plurality of containers containing the adsorbents, and the containers are arranged in a series flow path in which the effluent passes through the first container, e.g. container 34.1, and then through a second container 34.2 so that the adsorbent in the first container becomes exhausted before adsorbent in the second container. To improve efficiency of use of the adsorbents, when the adsorbent in the first container becomes exhausted, the quick release conduit couplings are disconnected so that the first container is removed from the first set of containers, and the second container 34.2 is connected to the conduit 26 so as to receive effluent first. Thus, the flow path is changed so that the second container receives the effluent flow first. Initially, the flow leaves the first set of containers 31 through the last container 34.4 so that the adsorbent in the last container is least exhausted. However, when the first container 34.1 has been removed, the exhausted first container is replaced with a fresh container, not shown, containing fresh adsorbent and the fresh container is then connected downstream from the previous last container 34.4. Thus, flow is now directed from the container 34.4 into the fresh container, which then becomes the last container of the first set, and is also coupled to the conduit 37 to feed fluid into the second set of containers.

Thus, in summary, the process further comprises replacing the exhausted first container with a fresh container containing fresh adsorbent, and redirecting flow from the last container into the fresh container so as to protect the fresh adsorbent in the new last container from premature contamination. In this way, the container with the least contaminated adsorbent is always the last container of a particular set of containers. A similar procedure can be used for the second set of containers 32. Clearly, for mechanical simplicity, in the present structure the individual containers are mounted on wheels and fitted with quick connect conduit couplings so as to permit easy re-positioning of containers and re-directing of fluid through the containers. Clearly, in an arrangement where containers were not to be moved, rigid conduits could be interconnected with valves which would permit substitution of fresh containers for exhausted containers, and redirecting of fluid flow as described, so as to obtain the same benefits of the manual disconnections as described above.

When the adsorbent in each of the containers becomes exhausted, the containers are stored for later shipment in batches to a reprocessing plant, where, depending upon the adsorbent, it can be destroyed by incineration, or alternatively the adsorbent can be treated to extract the contaminants therefrom, so that the adsorbent can be reused. In other circumstances, the exhausted adsorbent can be dumped in a landfill. Clearly, transportation of relatively small volumes of concentrated toxic materials in adsorbent containers is environmentally safer than transporting relatively large volumes of contaminated liquids from which the contaminants have not yet been extracted.

The high level alarm sensors 16 and/or 52 are not usually activated by the liquid level as the respective pump usually starts pumping liquid when the upper level sensor 17 and/or 53 is activated as the respective tank is filling. The alarm sensors are activated only if a failure occurs and the respective tank os in danger of overflowing. The alarm sensor 72 is usually activated to indicate when the tank 70 is full.

ALTERNATIVES

The above description is directed to processing photofinishing effluent discharged from a colour processing machine in a "mini-lab". Clearly, the present invention could have applications in other laboratories where relative small amounts of photographic work is done, for example in film studios, in hospitals where X-ray processing is done, in art studios and any other areas which generate photofinishing chemicals as an undesirable effluent which requires on-site processing to simplify disposal. While theoretically the sequence of effluent flow through the two dissimilar adsorbents is not important, e.g. the effluent can alternatively flow first through the adsorbent to adsorb organic compounds, and then through the adsorbent to adsorb inorganic compounds, in practice, for economic reasons, the least costly adsorbent is placed upstream of the more costly adsorbent to protect the more costly adsorbent. Thus, based on present cost of adsorbents, the adsorbent for the inorganic compounds, namely activated attapulgite, etc., is placed upstream of the adsorbent for the organic compounds, namely activated carbon. However, it is clearly important that the two dissimilar adsorbents are disposed upstream from the membrane filtration system, so as to protect the more sensitive and costly membrane filtration system from fouling with any materials that are otherwise adsorbed by the adsorbents.

I claim:

1. A process of purifying a photofinishing chemical effluent, the process comprising steps of:

(a) passing the effluent through a plurality of adsorbents, in which at least one adsorbent adsorbs inorganic compounds, and at least one other adsorbent adsorbs organic compounds to produce a primary filtrate fluid, followed by, (b) directing the primary filtrate fluid to a membrane filter and discharging permeate fluid that passes through the membrane filter as a secondary filtrate fluid for disposal or re-use, and essentially simultaneously, (c) rejecting concentrate fluid that does not pass through the membrane filter and collecting said concentrate fluid.

2. A process as claimed in claim 1 further comprising the steps of:

(a) passing the effluent through a plurality of containers containing the adsorbents, at least a first and a second container of said plurality of containers contain functionally similar adsorbents and are arranged in a series flow path in which the effluent passes through the first container and then through the second container, so that the adsorbent in the first container becomes exhausted before the adsorbent in the second container becomes exhausted, and (b) when the adsorbent in the first container becomes exhausted, changing the flow path so that the second container receives the effluent flow first.

3. A process as claimed in claim 2, further characterized by:

(a) replacing the exhausted first container with a fresh container containing fresh adsorbent, and (b) re-directing flow from the last container into the fresh container.

4. A process as claimed in claim 1, further characterized by:

(a) storing the primary filtrate fluid in a tank, (b) detecting a relatively high level of filtrate fluid in the tank, (c) pressurizing flow of the primary filtrate fluid prior to passing through the membrane filter, (d) detecting a relatively low level of filtrate fluid in the tank, and (e) stopping flow of the primary filtrate fluid from the tank through the membrane filter.

5. A process as claimed in claim 1, further characterized by:

(a) re-circulating the concentrate fluid rejected by the membrane filter to mix with the primary filtrate fluid prior to passing through the membrane filter.

6. A process as claimed in claim 1, further characterized by:

(a) selecting said adsorbent to adsorb inorganic compounds from the group consisting of activated attapulgite, bentonite, zeolite, montmorillonite, and molecular sieve; and (b) selecting adsorbent containing activated carbon to adsorb organic compounds.

7. A process as claimed in claim 1, in which:

(a) the membrane filter is an ultra-filtration, nano-filtration or reverse osmosis filter.

8. A process as claimed in claim 1, further characterized by:

(a) prior to passing the effluent through the adsorbent, recovering silver from any silver-bearing effluent within the said effluent.

9. A process as claimed in claim 1 further characterized by:

(a) passing the effluent through a relatively coarse filter prior to passing through the adsorbent, and (b) passing the effluent discharged from the adsorbents through a relatively fine filter prior to passing through the membrane filter.

10. A process as claimed in claim 1, further wherein:

(a) said one adsorbent which adsorbs inorganic compounds is dissimilar to the one other adsorbent which adsorbs organic compounds.

11. A process as claimed in claim 10 further characterized by:

(a) while passing the effluent through the adsorbents, maintaining the dissimilar adsorbents in separate containers to enable replacement of a particular adsorbent as that particular adsorbent becomes exhausted.

12. An apparatus for purifying photofinishing chemical effluent, the apparatus comprising:

(a) an adsorbent means for adsorbing organic and inorganic compounds, the adsorbent means having an inlet to receive the effluent and an outlet to discharge the effluent as a primary filtrate fluid, the adsorbent means having a plurality of adsorbent containers connected in series, in which at least one container contains an adsorbent to adsorb inorganic compounds, and at least one other container contains an adsorbent to adsorb organic compounds, and (b) a membrane filtration apparatus having a membrane filter, an inlet to receive the primary filtrate fluid discharged from the adsorbent means, a permeate fluid outlet to discharge permeate fluid passing through the filter as a secondary filtrate fluid, and a concentrate fluid outlet to discharge concentrate fluid that is rejected by the membrane filter.

13. An apparatus as claimed in claim 11, in which:

(a) a first and a second container of said plurality of containers contain functionally similar adsorbents, the containers being arranged in series so that the effluent passes from the first container into the second container so that adsorbent in the first container becomes exhausted before the adsorbent in the second container becomes exhausted, and (b) each container has a respective inlet and outlet with a respective conduit connecting means and the apparatus further comprises:

(c) a plurality of conduits having opposite ends fitted with connecting means which are complementary to the conduit connecting means or the inlets and outlets of the containers, and (d) one conduit extends between the outlet of the first container and the inlet of the second container.

14. An apparatus as claimed in claim 12, further comprising:

(a) a tank to store the primary filtrate fluid, the tank having upper and lower level detectors, and a tank inlet, a tank outlet, the tank inlet communicating with the adsorbent means, and (b) a high pressure pump having an inlet communicating with the tank outlet, and an outlet communicating with the membrane filtering means.

15. An apparatus as claimed in claim 14, in which:

(a) the upper level detector in the tank cooperates with the high pressure pump so as to initiate pumping when the upper level detector is activated when the tank is being filled, and (b) the low level detector cooperates with the high pressure pump so as to stop the pump when the low level detector is activated when the tank is being emptied.

16. An apparatus as claimed in claim 12, further comprising:

(a) a recirculating conduit extending from the fluid concentrate outlet to communicate with the primary filtrate fluid in said tank.

17. An apparatus as claimed in claim 12, further comprising:

(a) a silver recovery means having an inlet communicating with a conduit containing silver bearing effluent, and an outlet communicating with the inlet of the adsorbent means.

18. An apparatus as claimed in claim 12, in which:

(a) the container containing the adsorbent to adsorb inorganic compounds contains a substance selected from the group consisting of activated attapulgite, bentonite, montmorillonite, zeolite, and molecular sieve; and (b) the container containing the adsorbent to adsorb organic compounds contains activated carbon.

19. An apparatus as claimed in claim 12, in which:

(a) the membrane filtering means comprises an ultra-filtration, nano-filtration or reverse osmosis filter.

20. An apparatus as claimed in claim 12, further comprising:

(a) a relatively coarse filter located upstream of the inlet of the adsorbent means, and (b) a relatively fine filter located between the adsorbent means and the membrane filter.

21. An apparatus as claimed in claim 12, in which:

(a) the adsorbent to adsorb inorganic compounds is dissimilar to the adsorbent which adsorbs organic compounds.

22. An apparatus as claimed in claim 12, in which:

(a) the containers are arranged in two sets, in which one set of containers contains the adsorbent to adsorb inorganic compounds, and the other set contains a dissimilar adsorbent to adsorb organic compounds, such that dissimilar adsorbents are maintained in separate containers to enable replacement of a particular adsorbent as that particular adsorbent becomes exhausted.

23. A process of purifying a photofinishing chemical effluent, the process comprising steps of:

(a) recovering silver from any silver bearing effluent within said effluent, followed by:

(b) passing at least the effluent from which silver has been recovered through a plurality of adsorbents, in which at least one adsorbent adsorbs inorganic compounds, and at least one other adsorbent adsorbs organic compounds to produce a primary filtrate fluid, (c) directing the primary filtrate fluid to a membrane filter and discharging permeate fluid that passes through the membrane filter as a secondary filtrate fluid for disposal or re-use, and (d) rejecting concentrate fluid that does not pass through the membrane filter and collecting said concentrate fluid.

24. A process of purifying a photofinishing chemical effluent, the process comprising steps of:
  (a) passing the effluent through a plurality of adsorbents, in which at least one adsorbent adsorbs inorganic compounds, and at least one other adsorbent adsorbs organic compounds to produce a primary filtrate fluid, said one adsorbent to adsorb inorganic compounds containing a substance selected from the group consisting of activated attapulgite, bentonite, zeolite, montmorillonite, and molecular sieve; said one other adsorbent to adsorb organic compounds containing activated carbon,
  (b) directing the primary filtrate fluid to a membrane filter and discharging permeate fluid that passes through the membrane filter as a secondary filtrate fluid for disposal or reuse, and
  (c) collecting said concentrate fluid.

25. An apparatus for purifying photofinishing chemical effluent, the apparatus comprising:
  (a) a silver recovery means having an inlet to receive a silver bearing effluent, and an outlet,
  (b) an adsorbent means for adsorbing organic and inorganic compounds, the adsorbent means having an inlet connected to at least the outlet of the silver recovery means to receive at least the effluent discharged therefrom and an outlet to discharge the effluent as a primary filtrate fluid, the adsorbent means having a plurality of adsorbent containers connected in series, in which at least one container contains an adsorbent to adsorb inorganic compounds, and at least one other container contains an adsorbent to adsorb organic compounds, and
  (c) a membrane filtration apparatus having a membrane filter, an inlet to receive the primary filtrate fluid discharged from the adsorbent means, a permeate fluid outlet to discharge permeate fluid passing through the filter as a secondary filtrate fluid, and a concentrate fluid outlet to discharge concentrate fluid that is rejected by the membrane filter.

26. An apparatus for purifying photofinishing chemical effluent, the apparatus comprising:
  (a) an adsorbent means for adsorbing organic and inorganic compounds, the adsorbent means having an inlet to receive the effluent and an outlet to discharge the effluent as a primary filtrate fluid, the adsorbent means having a plurality of adsorbent containers connected in series, in which at least one container contains an adsorbent to adsorb inorganic compounds and contains a substance selected from the group consisting of activated attapulgite, bentonite, montmorillonite, zeolite, and molecular sieve; and at least one container contains an adsorbent to adsorb organic compounds and contains activated carbon, and
  (b) a membrane filtration apparatus having a membrane filter, an inlet to receive the primary filtrate fluid discharged from the adsorbent means, a permeate fluid outlet to discharge permeate fluid passing through the filter as a secondary filtrate fluid, and a concentrate fluid outlet to discharge concentrate fluid that is rejected by the membrane filter.

* * * * *